US011216838B1

(12) United States Patent
Karlsson et al.

(10) Patent No.: US 11,216,838 B1
(45) Date of Patent: Jan. 4, 2022

(54) SYSTEMS AND METHODS FOR PROFILING CONVERSIONS OF ONLINE EVENTS

(71) Applicant: Oath (Americas), Inc., Dulles, VA (US)

(72) Inventors: Niklas Karlsson, Mountain View, CA (US); Mohsen Moslehpour, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 852 days.

(21) Appl. No.: 15/628,505

(22) Filed: Jun. 20, 2017

(51) Int. Cl.
*G06Q 30/00* (2012.01)
*G06Q 30/02* (2012.01)
*G06F 17/18* (2006.01)

(52) U.S. Cl.
CPC ......... *G06Q 30/0242* (2013.01); *G06F 17/18* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 9,767,489 | B1 * | 9/2017 | Liu | G06Q 30/0249 |
| 2011/0302025 | A1 * | 12/2011 | Hsiao | G06Q 30/02 705/14.42 |
| 2012/0197711 | A1 * | 8/2012 | Zhou | G06Q 30/0242 705/14.41 |
| 2016/0148253 | A1 * | 5/2016 | Kawale | G06Q 30/0247 705/14.46 |

OTHER PUBLICATIONS

Pareto Distribution Wiki, https://en.wikipedia.org/w/index.php?title=Pareto_distribution&oldid=701554358, Jan. 25, 2016 (Year: 2016).*
Maximum Likelihood Estimation Wiki, https://en.wikipedia.org/w/index.php?title=Maximum_likelihood_estimation&oldid=701940647, Jan. 27, 2016 (Year: 2016).*
(Continued)

*Primary Examiner* — Michael Bekerman
(74) *Attorney, Agent, or Firm* — Cooper Legal Group, LLC

(57) ABSTRACT

Embodiments are directed at determining a conversion rate and a latency distribution for an online campaign. The conversion rate indicates a ratio of an overall number of converted impressions to the number of previously provided impressions. The converted impressions are a subset of the set of previously provided impressions. One method includes receiving conversions from the campaign and determining an observed latency for the conversions. Each conversion is uniquely associated with one of the converted impressions. The observed latencies are based on a temporal difference between the conversion and the associated converted impression. The method simultaneously determines each of the conversion rate and parameters of the latency distribution. The latency distribution indicates a temporal distribution of the observed latencies. Determining the conversion rate and parameters of the distribution is based on employing a constraint or relationship between the conversion rate and the distribution and an interior point or Newton-Raphson method.

20 Claims, 11 Drawing Sheets

(56) References Cited

OTHER PUBLICATIONS

Lagrange Multipliers Wiki https://en.wikipedia.org/w/index.php?title=Maximum_likelihood_estimation&oldid=701940647, Feb. 9, 2016. (Year: 2016).*
InteriorPoint Method Wiki https://en.wikipedia.org/w/index.php?title=Interior-point_method&oldid=702555846, Jan. 31, 2016 (Year: 2016).*
Newton-Raphson Wiki https://en.wikipedia.org/w/index.php?title=Newton%27s_method&oldid=700034503, Jan. 15, 2016. (Year: 2016).*
Karlsson, Niklas, "CPA Latency", AOL, Oct. 18, 2008, 5 pages.
Moslehpour, Mohsen, "Concurrent On-line Latency Profiling with Pareto Distribution and Event Rate Estimation in Display Advertising", Draft Ver. 0.3, AOL Platforms, Algorithm Research, Dec. 23, 2016, 14 pages.
Moslehpour, Mohsen et al., "Simultaneous Estimation of Latency Distribution and Event Rate", Ver. 1.0, AOL, Feb. 16, 2017, 15 pages.
Karlsson, Niklas et al., "Particle Filter-based Latency Estimation", Advertising.com, Jan. 11, 2008, 36 pages.

* cited by examiner

420 →
$$\lambda = \frac{-\sum_{k_1=0}^{L/\Delta t} n_I(k-k_1) \cdot (1 - F((k_1+1)\Delta t \mid \theta)) \cdot \log(1 - F((k_1+1)\Delta t \mid \theta))}{\sum_{k_1=0}^{k-1-L/\Delta t} n_I(k_1) + \sum_{k_1=0}^{L/\Delta t} (n_I(k-k_1) \cdot F((k_1+1)\Delta t \mid \theta))}$$

430 →
$$p_0 = \frac{\sum_{k_1=0}^{k} n_E^{tot}(k_1, k)}{\sum_{k_1=0}^{k-1-L/\Delta t} n_I(k_1) + \sum_{k_1=0}^{L/\Delta t} (n_I(k-k_1) \cdot F((k_1+1)\Delta t \mid \theta))}$$

440 →
$$\frac{N}{\theta} + N \log T_{\min} - \sum_{i=1}^{N} \log \tau_i - N \frac{-\log \frac{T_{\min}}{T_{\max}} \cdot \left(\frac{T_{\min}}{T_{\max}}\right)^{\theta}}{1 - \left(\frac{T_{\min}}{T_{\max}}\right)^{\theta}}$$
$$+ \sum_{k_1=0}^{L/\Delta t} \left( p_0 \cdot n_I(k-k_1) \cdot \frac{-\partial F((k_1+1)\Delta t \mid \theta)}{\partial \theta} (1 + \log(1 - F((k_1+1)\Delta t \mid \theta))) \right)$$
$$+ \lambda \cdot p_0 \sum_{k_1=0}^{L/\Delta t} \left( n_I(k-k_1) \cdot \frac{\partial F((k_1+1)\Delta t \mid \theta)}{\partial \theta} \right) = 0$$

Fig. 4B

1: Configuration parameters: $L, \Delta t, \delta$
2: Input signals: $n_I(k), \overline{n_{UE}}(k)$
3: States: $N(k), \eta(k), \alpha(k), \beta(k), \Phi(k), \Psi(k)$
4: Computation:
5: for $k = 0, 1, \ldots$ do
6: $\quad L_i = L/\Delta t$
7: $\quad$ if $k == 0$ then
8: $\quad\quad N(0) = \overline{n_{UE}}(0)(0)$
9: $\quad\quad \Phi(0) = \{\overline{n_{UE}}(0)(0), \{\Phi(0)(l) = 0 | l = 1, \cdots, L_i\}\}$
10: $\quad\quad \Psi(0) = \{n_I(0), \{\Psi(0)(l) = 0 | l = 1, \cdots, L_i\}\}$
11: $\quad\quad \eta(0) = \overline{n_{UE}}(0)(0) \cdot \log(0 + \delta)$
12: $\quad\quad \alpha(0) = 0$
13: $\quad\quad \beta(0) = 0$
14: $\quad$ else
15: $\quad\quad N(k) = N(k-1) + \sum_{j=0}^{L_i} \overline{n_{UE}}(k)(j)$
16: $\quad\quad \Phi(k) = \{0, \{\Phi(k-1)(j) | j = 0, \cdots, L_i - 1\}\} + \overline{n_{UE}}(k)$
17: $\quad\quad \Psi(k) = \{n_I(k), \{\Psi(k-1)(j) | j = 0, \cdots, L_i - 1\}\}$
18: $\quad\quad \eta(k) = \eta(k-1) + \sum_{l=0}^{L_i} \overline{n_{UE}}(k)(l) \cdot \log(l + \delta)$
19: $\quad\quad \alpha(k) = \alpha(k-1) + \Phi(k-1)(L_i)$
20: $\quad\quad \beta(k) = \beta(k-1) + \Psi(k-1)(L_i)$
21: $\quad$ end
22: $\quad$ return $N(k), \Phi(k), \Psi(k), \eta(k), \alpha(k), \beta(k)$
23: end

Fig. 5B

1: Configuration parameters: $T_{min}, L, \Delta t, \delta, \theta_0, \epsilon$
2: Input signals: $N(k), \Phi(k), \Psi(k), \eta(k), \alpha(k), \beta(k)$
3: Output signals: $\theta(k), p_0(k)$
4: Computation:
5: for $k = 0, 1, \ldots$ do
6:    if $N(k) > 0$ then
7:       repeat
8:          [value, gradient] = ObjectiveFunction($\theta_0, N(k), \Phi(k),$
                  $\Psi(k), \eta(k), \alpha(k), \beta(k), T_{min}, L, \Delta t, \delta$)
9:          $\theta_n$ = InteriorPointMethod($\theta_0$, value, gradient)
10:         $e = |\theta_n - \theta_0|$
11:         $\theta_0 = \theta_n$
12:      until $e < \epsilon$
13:      $\theta(k) = \theta_0$
14:      $p_0 = \dfrac{\alpha(k) + \sum_{j=0}^{L/\Delta t} \Phi(k)(j)}{\beta(k) + \sum_{j=0}^{L/\Delta t} \Psi(k)(j) F((j+1) \cdot \Delta t \mid \theta(k))}$
15:    else
16:      $\theta(k) = \theta_0$
17:      $p_0 = 0$
18:    end
19:    return $\theta(k), p_0(k)$
20: end

SYSTEMS AND METHODS FOR PROFILING CONVERSIONS OF ONLINE EVENTS

TECHNICAL FIELD

The present disclosure relates generally to online advertising. More specifically, and without limitation, the present disclosure relates to systems and methods for determining a profile for conversions of online events.

BACKGROUND

Online marketers are interested in providing impressions, such as messages, advertisements, and/or other content, on websites to promote their products or services. Influenced by an impression, a user may take an action, such as purchasing one or more items or services associated with the impression. An impression is said to be converted when a user takes such an action and the action can be reasonably inferred to occur, at least somewhat, in response to the user being provided and viewing the impression.

Typically, only a fraction of provided impressions are ever converted. This fraction is estimated as a conversion rate. Furthermore, of the converted impressions, the temporal difference between providing the impression to the user and the user taking action to convert the impression may vary significantly from impression to impression. This temporal difference for a particular converted impression is referred to as the conversion's latency. Similar to other random variables, converted impressions may be distributed within a latency distribution.

When controlling an online campaign, online marketers may desire to track various campaign performance metrics, such as cost per impression, cost per action, cost per click, cost per conversion, and the like. More specifically, when contemplating the rate and cost of providing impressions, online marketers are interested in modeling the conversion profiles (i.e., a conversion rate and a latency distribution) for the campaign. That is, when deciding whether to provide an impression to a user, online marketers are interested in tracking the proportion of provided impressions that will be converted and, the temporal profile of the conversions.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In accordance with various embodiments of the present disclosure, a computer-implemented method is provided for determining a conversion profile for an online campaign. The conversion profile may include a conversion rate and a latency distribution for the campaign. The conversion rate for the campaign may indicate a ratio of a size (e.g., a number or volume) of overall converted impressions to a size of a set of previously provided impressions. In some embodiments, the conversion rate indicates the ratio of the size of expected converted impressions to a size of a set of previously provided impressions. The converted impressions are a subset of the set of previously provided impressions. The method may include receiving conversions from the campaign and determining an observed latency for the conversions. Each conversion is uniquely associated with one of the converted impressions. The observed latencies are based on a temporal difference between the conversion and the associated converted impression. That is, the observed latency is the difference in the time that the conversion occurred to the time that the impression was provided to a user.

The method simultaneously determines each of the conversion rate and one or more parameters of the latency distribution. The latency distribution indicates a temporal distribution of the observed latencies. In some embodiments, the conversions are provided (e.g., uploaded) to a conversion module, such as conversion module 216 of FIG. 2, after the conversions are observed. Thus, in these embodiments, the latency distribution incorporates both the uploaded and observed latencies of the conversions. Determining the conversion rate and the parameters of the latency distribution is based on at least one of the conversions, the set of previously provided impressions, the observed latencies, the converted impressions, and/or the parameters of the latency distribution. As discussed throughout, a constraint or relationship between the conversion rate and the latency distribution is employed to determine the conversion rate and the parameters of the latency distribution.

The method may further include generating and/or updating a correlation map between the conversions and the converted impressions. For at each conversion that was observed at least within a look-back window, the correlation map may indicate the associated converted impression and the observed latency. In some embodiments, the latency distribution is a Pareto distribution and the parameters of the latency distribution include at least a shape parameter and a scale parameter of the Pareto distribution.

In various embodiments, determining the conversion rate and the parameters of the latency distribution includes employing a maximum likelihood estimation (MLE) based on the observed latencies. The conversion rate and the parameters of the distribution maybe estimated independently.

The conversion rate may be based on a total number of observed conversions, a number of impressions that have been provided outside of a current look-back window, and a number of impressions that have been provided within the current look-back window. In some embodiments, an interior point method is iteratively employed. That is, the interior point method is employed to iteratively update values for the conversion rate and the parameters of the latency distribution based on previously determined values for the conversion rate and the parameters of the latency distribution. In other embodiments, a Newton-Raphson iterative method is employed to iteratively update the values for the conversion rate and the parameters of the latency distribution.

This summary is provided to introduce a selection of concepts in a simplified form that are further described below in the Detailed Description of the Embodiments. This summary is not intended to identify key features or essential features of the claimed subject matter, nor is it intended to be used as an aid in determining the scope of the claimed subject matter.

BRIEF DESCRIPTION OF THE DRAWINGS

FIG. 4B shows equations for the simultaneous determination of the conversion rate and latency distribution via a Pareto distribution model that is in accordance with various embodiments of the present disclosure.

FIG. 5B shows pseudo-code implemented by the profile module of FIG. 5A.

FIG. 6A shows additional pseudo-code implemented by the profile module of FIG. 5A.

FIG. 6B shows explicit expressions of an objective function employed by the profile module of FIG. 5A.

DETAILED DESCRIPTION OF THE EMBODIMENTS

Figure 1:
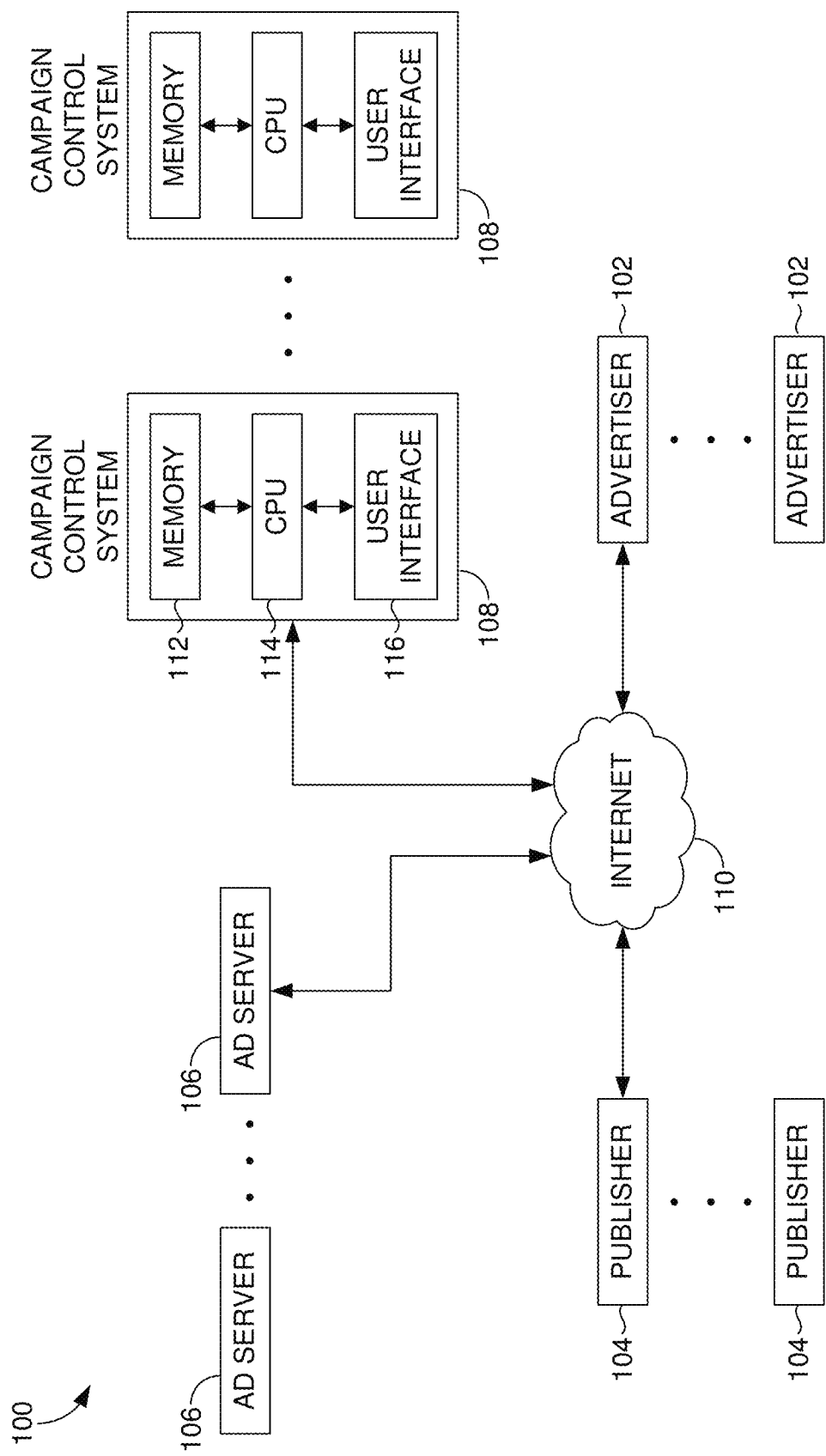
FIG. 1 depicts an illustrative advertising system, in accordance with embodiments of the present disclosure.

The various embodiments herein are directed towards methods and systems for determining the conversion profiles for online events. More specifically, the embodiments are directed towards simultaneously and iteratively determining each of a conversion rate and a latency distribution for the conversions of online impressions. That is, the embodiments are directed towards the determination of the proportion of provided impressions that are converted and the statistical distribution that is most likely to be consistent with the observed latencies of the converted impressions.

Previous conventional approaches for modeling the conversion profile of a campaign have estimated a conversion rate or a latency distribution separately. However, as discussed below, conventional approaches have not simultaneously determined each of the conversion rate and the latency distribution, based on an explicit correlation (or relationship) between them, as the embodiments herein do. Furthermore, some of the conventional approaches have assumed unrealistic families of statistical distributions, whereas the embodiments herein are not specific to any particular statistical distribution. That is, the embodiments herein may be applied to any number of statistical distributions. Additionally, some conventional approaches fail to consider volatility in the volume (per unit time) of provided impressions, which may result in biased estimations of the conversion profile. The embodiments herein explicitly account for any variation in the impression volume, and thus do not result in biased determinations of the conversion profile.

In general, internet "advertisers" and/or "marketers" (hereinafter used interchangeably to refer to a party that pays to provide content via a website or other forum provided via a computer communication network) often create "online campaigns" (or simply "campaigns") that include numerous content, such as advertisements designed to be placed on websites during a specified period of time. For example, a party, such as a marketer or advertiser, may design a "banner ad" or other such content associated with a product or service offered by the company. The party may wish to have the content placed on websites to promote the product or service.

Each instance that content is provided to a user may hereinafter be referred to as an "impression." An impression may be associated with one or more items and/or services. For example, an impression may be advertising, or otherwise targeting an item or a service, as promoted by the marketer. The number of impressions provided per unit time in a campaign may be referred to as the "impression volume" of the campaign. As used herein, and as discussed below, the terms "online market," "marketplace," "market," "advertising networks," or "marketing networks" are used interchangeably to refer to an environment, ecosystem, or platform where advertisers or marketers provide impressions to users.

Once provided to a user, the user may take a particular "action," in response to viewing or listening to the provided impression. Such actions include, but are not otherwise limited to completing an online form to request additional information with regard to the product or service associated with a particular impression. Another exemplary action includes when the user purchases a product or service associated with a particular impression. When the user performs such an action, and when the action can be reasonably inferred to have occurred, at least somewhat, in response to the user being provided and viewing the impression, the impression is said to be "converted." The terms "conversion" or "conversion event" may be used interchangeably to refer to the user performing one or more predetermined actions, in response to being provided an impression. Such predetermined actions may include, but are not otherwise limited to a click, a purchase, a request for additional information, viewing and/or listening to content associated with the impression, or the like.

Within an online campaign, the ratio of the number of impressions that are converted to the total number of impressions that are provided is referred to the "conversion rate." For instance, when reviewing campaign data offline, if 1000 impressions are provided to users in an online campaign and 100 conversions are observed, the conversion rate of the campaign may be estimated at 10%. The conversion rate may be related to the cumulative distribution function (cdf) of the latency distribution, as shown in equation 430 of FIG. 4B. The number of conversions observed per unit time in a campaign may be referred to as the "conversion volume" of the campaign.

The time between providing the impression and the occurrence of the conversion may be referred to as the "latency" of the conversion. The latency of conversions typically varies, as a random variable, from conversion to conversion. For instance, of the fraction of impressions that are converted, some impressions may be converted in a short duration of time, while other impressions are converted within a longer duration of time. In the various embodiments, the conversions of a campaign may be temporally distributed within a "latency distribution." Accordingly, the latency of a conversion may be a random variable characterized by a statistical distribution.

At least due to temporal "smearing-out" of conversions, the determination of the conversion rate is more involved than simply the ratio of the conversion volume to the impression volume. For instance, volatility in the conversion volume does not perfectly correlate with volatility in the impression volume due to the temporal distribution of latencies of the conversions. Thus, conventional approaches for estimating a conversion rate based on such a ratio may result in biased estimations.

As discussed throughout, the conversion rate and the latency distribution are correlated, related, and/or coupled. Although various previously available conventional approaches have estimated at least one of the conversion rate or the latency distribution, such conventional approaches determine them separately and do not consider the relationship (or correlation) between them. When the determination is considered separately, as conventional approaches do, the determination of the conversion rate and the determination of the latency distribution may be significantly inaccurate due to not considering the relationship between them. In contrast to such conventional approaches, the various embodiments herein explicitly account for the relationship between the conversion rate and the latency distribution. That is, the determined value of the conversion rate is constrained by the determined latency distribution, and vice-versa.

As discussed below, conventional approaches that separately consider an estimation of the conversion rate and the latency distribution may significantly decrease a marketer's ability to control a campaign in a manner that is consistent with a desired goal, such as a desired cost per impression, cost per click, cost per conversion, or the like. That is, a marketer, employing a conventional approach, may ineffectively deploy financial resources and/or may experience loss of important opportunities to impress users and realize rewards associated with the impressions.

Other previous conventional approaches have employed Bayesian frameworks and/or assumed that the latency distribution is readily modeled via a Gamma distribution. The assumption of a Gamma distribution may be specifically problematic due to the "long tail" (or "heavy tail") of the actual latency distribution. In further contrast to these conventional approaches, the various embodiments are readily adaptable to any number of different statistical distributions, i.e., the embodiments do not assume a particular statistical distribution, such as a Gamma distribution, to determine a latency distribution. Furthermore, the embodiments do not assume a Bayesian framework.

Furthermore, some embodiments may employ an explicit constraint (or relationship) between the conversion ratio and the latency distribution in service of a Lagrange multiplier method within the maximal likelihood estimation (MLE) framework to determine the conversion rate and the latency distribution. During an iterative and simultaneous determination of each of the conversion rate and the latency distribution, each of a current estimate of the conversion rate and a current estimate of the latency distribution is employed to update each of the estimate of the conversion rate and the estimate of the latency distribution. Such iterative updates to the estimates are continued until convergence is achieved. Thus, the relationship between the conversion rate and the latency distribution is explicitly considered in the various embodiments; and the current estimations for each are used as feedback to iteratively update the estimations. Although the embodiments may be applied to any number of statistical distributions, some embodiments assume a Pareto distribution.

Exemplary Advertising System and Environment

FIG. 1 depicts an illustrative advertising system 100, in accordance with embodiments of the present disclosure. As shown in FIG. 1, advertising system 100 may include one or more advertisers 102, publishers 104, ad servers 106, and campaign control systems 108, that are in communication with one another through a network, such as the Internet 110. The number and orientation of the computing components in FIG. 1 is provided for purposes of illustration only. Any other number and orientation of components is possible. For example, one or more of advertisers 102, publishers 104, ad servers 106, and campaign control systems 108 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Advertisers 102 represent computing components associated with entities having online advertisements (e.g., banner ads, pop-ups, etc.) that the entities desire to deliver to online consumers. Advertisers 102 may interact with publishers 104, ad servers 106, and/or campaign control systems 108 through the Internet 110. Thus, advertisers 102 may be able to communicate advertising information, such as ad information, targeting information, consumer information, budget information, bidding information, etc., to other entities in system 100.

Publishers 104 represent computing components associated with entities having inventories of available online advertising space. For example, publishers 104 may include computing components associated with online content providers, search engines, e-mail programs, web-based applications, or any computing component or program having online user traffic. Publishers 104 may interact with advertisers 102, ad servers 106, and/or campaign control systems 108 via the Internet 110. Thus, publishers 104 may be able to communicate inventory information, such as site information, demographic information, cost information, etc., to other computing components in system 100.

Ad servers 106 may include servers or clusters of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on control signals generated by campaign control systems 108.

Figure 2:
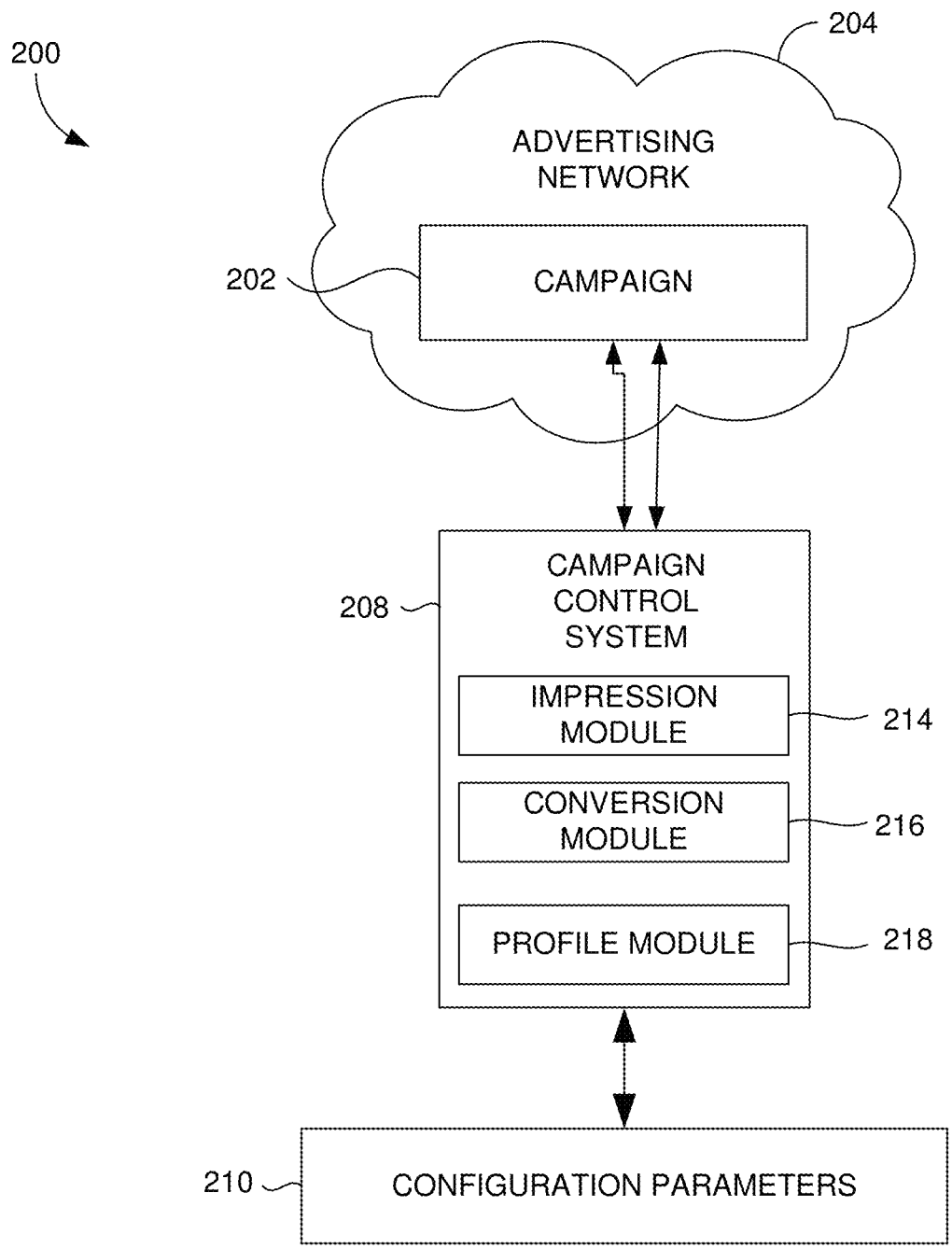
FIG. 2 depicts an illustrative online advertising control system for determining a conversion profile of an online advertising campaign operating in an online advertising network, in accordance with various embodiments of the present disclosure.

Various embodiments of campaign control systems, such as but not limited to campaign control systems 108, are discussed in conjunction with at least campaign control system 208 of FIG. 2. Campaign control systems 108 may include computing systems configured to receive information from computing components in system 100, process the information, and generate advertising control signals to be sent to other computing components in system 100, according to the illustrative methods described herein. Campaign control systems 108 may include any type or combination of computing systems, such as clustered computing machines and/or servers, including virtual computing machines and/or virtual servers. Campaign control systems 108 may include, for example, implementations of Adlearn Open Platforms (AOP) control systems offered by America Online (AOL) of New York, N.Y. In some embodiments, campaign control systems 108 may include an assembly of hardware, including a memory 112, a central processing unit ("CPU"), and/or a user interface 116. Memory 112 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touchscreen or pad, keyboard, and/or mouse. In other embodiments, campaign control systems 108 may include virtual representations of hardware operating, for example, on a virtualization server.

Exemplary Campaign Control System

FIG. 2 depicts an illustrative online advertising or marketing environment 200 for determining a conversion profile of an online advertising or marketing campaign 202 operating in an online advertiser or marketing network 204. Advertising network 204 may include a network or collection of one or more advertisers 102, one or more publishers 104, ad servers 106, campaign control systems 108, or other components of system 100 of FIG. 1. Elements of advertising network 204 may operate to receive impression requests associated with one or more advertising inventories, e.g., from publishers 104 such as websites or other computing components with an inventory of online marketing space. Advertising network 204 may also group impression requests for various advertising campaigns, e.g., according to impressions to be "targeted" based on a combination of attributes defined by the marketing requests. Advertising network 204 may also accept bids (e.g., from one or more campaign control systems 208) on the impression requests and process the bids to serve ads to the impression requests.

Any number or type of advertising campaigns 202 may be operated within advertising network 204, across various ad servers and domains associated with the Internet. Online advertising environment 200 may be implemented by one or more of the advertisers 102, publishers 104, ad servers 106, and/or campaign control systems 108 described in FIG. 1. For example, online advertiser environment 200 may represent the interaction of one or more campaign control systems 208 with one or more computing components in system 100.

In one embodiment, online advertising environment 200 may include one or more instances of campaign control system 208. Campaign control system 208 may include, or be similar to at least one of campaign control systems 108 of FIG. 1. Campaign control system 208 may comprise computers or servers connected to the Internet. Such computers or servers may be configured as described with respect to campaign control system 108, as depicted by FIG. 1, or in any other suitable configuration. Alternatively, campaign control system 208 may be implemented by software modules executed by CPUs 114 of campaign control system 208. Campaign control system 208 may be embodied entirely in hardware, entirely in software, or in any combination of hardware and software implemented across any number of computing devices.

Campaign control system 208 may be provided with a set of configuration parameters 210, which may be adjustably set by a user. For instance, the set of configuration parameters may include, but are not otherwise limited to a look-back window length (L), a data-sampling interval ($\Delta t$), an offset in latency ($\delta$), one or more statistical distribution scale parameters (e.g., $T_{min}$), one or more initial statistical distribution parameters (e.g., $\theta_0$), one or more convergence parameters (e.g., $\varepsilon$), and the like. The set of configuration parameters 210 may be implemented by one or more campaign control systems, including but not limited to campaign control system 208.

In one embodiment, campaign control system 208 may be a control system configured to, in response to receiving an impression request, provide impressions to campaign 202 and receive conversions from campaign 202. More specifically, impression module 214 may be enabled to receive impression requests from campaign 202, and in response, provide impressions to campaign 202. In various embodiments, impression module 214 provides campaign 202 impressions at an impression volume based on at least one of a determined conversion rate, a determined latency distribution, and/or an impression request. Conversion module 216 is enabled to receive conversions from campaign 202. Conversion module 216 and/or profile module 218 is enabled to generate a correlation map between the provided impressions and the received conversions. Furthermore, conversion module 216 and/or profile module 218 is enabled to generate/update various signals based on the provided impressions, received conversions, correlation map, and the configuration parameters. Profile module 218 is enabled to iteratively determine a latency distribution and a conversion rate based on the provided impressions, the received conversions, the correlation map, and one or more of configuration parameters 210.

Exemplary Impression Volumes and Exemplary Conversion Volumes

Figure 3A:
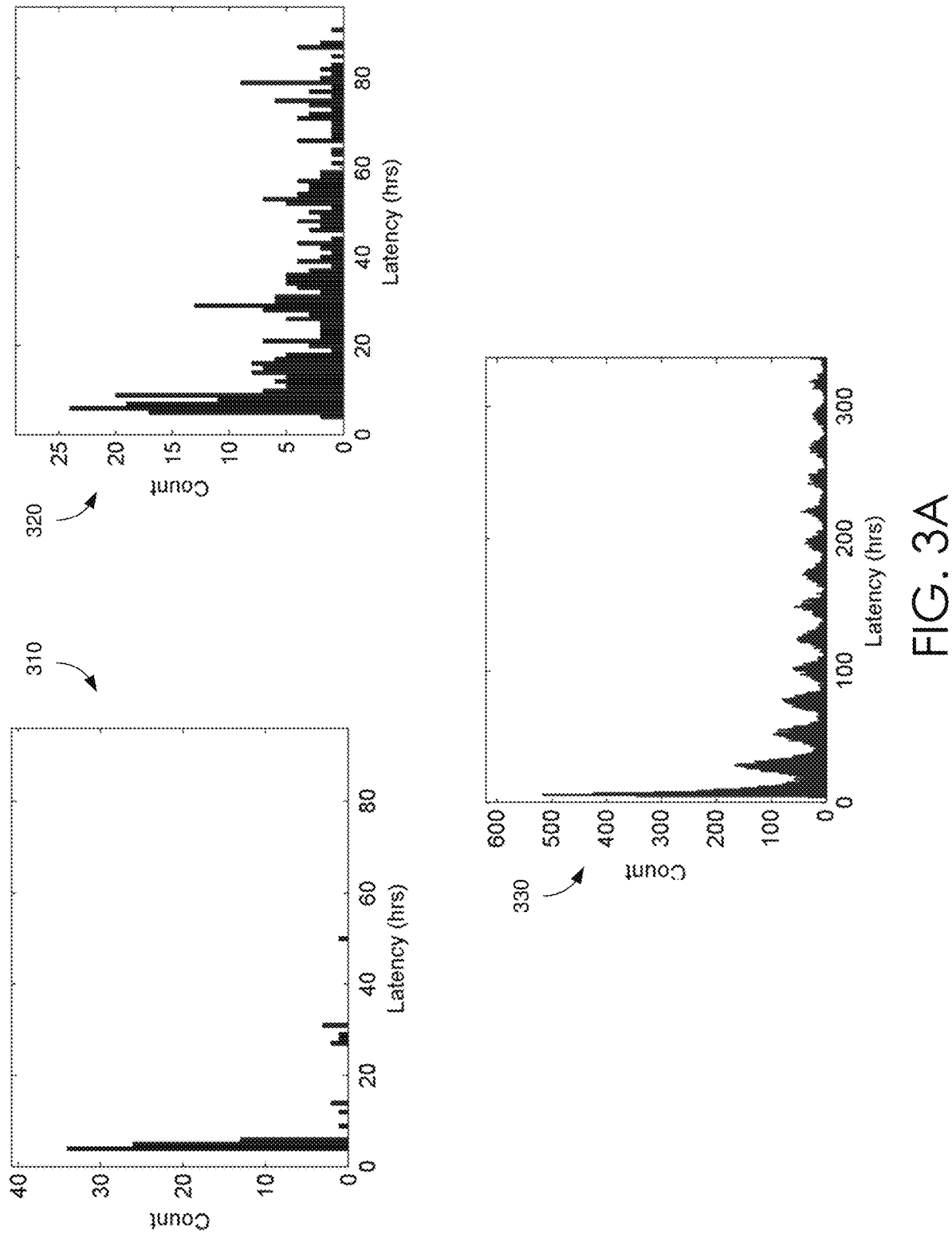
FIG. 3A depicts exemplary latency distributions for various online campaigns, in accordance with embodiments of the present disclosure.

FIG. 3A depicts historical latency distributions for various real online campaigns. Histogram 310 of FIG. 3A shows the latency distribution (in hours) for the conversions within a first campaign. Likewise, histogram 320 shows the latency distribution for the conversions within a second campaign. Histogram 330 shows the latency distribution for the conversions within a third campaign. As shown in FIG. 3A, the nature of a latency distribution typically varies with the tactics and strategies employed, as well as the nature of the provided impressions and the conversion actions associated with the impressions and the campaign.

For instance, a latency distribution for a campaign that is providing impressions where the conversion action is a click, may have a lower mean latency, i.e., if the user is going to convert the impression via a click, the conversion may typically occur within minutes to hours. For campaigns that are interested in providing impressions where the conversion action is a as purchase of a relatively high-cost item, the conversion may occur within hours to days after being provided the impression. For instance, the latency distribution of the first campaign (histogram 310) has a lower mean latency than the latency distribution of the second campaign (histogram 320). The latency distribution of other campaigns, such as the third campaign (histogram 330) may include multimodal structures.

Figure 3B:
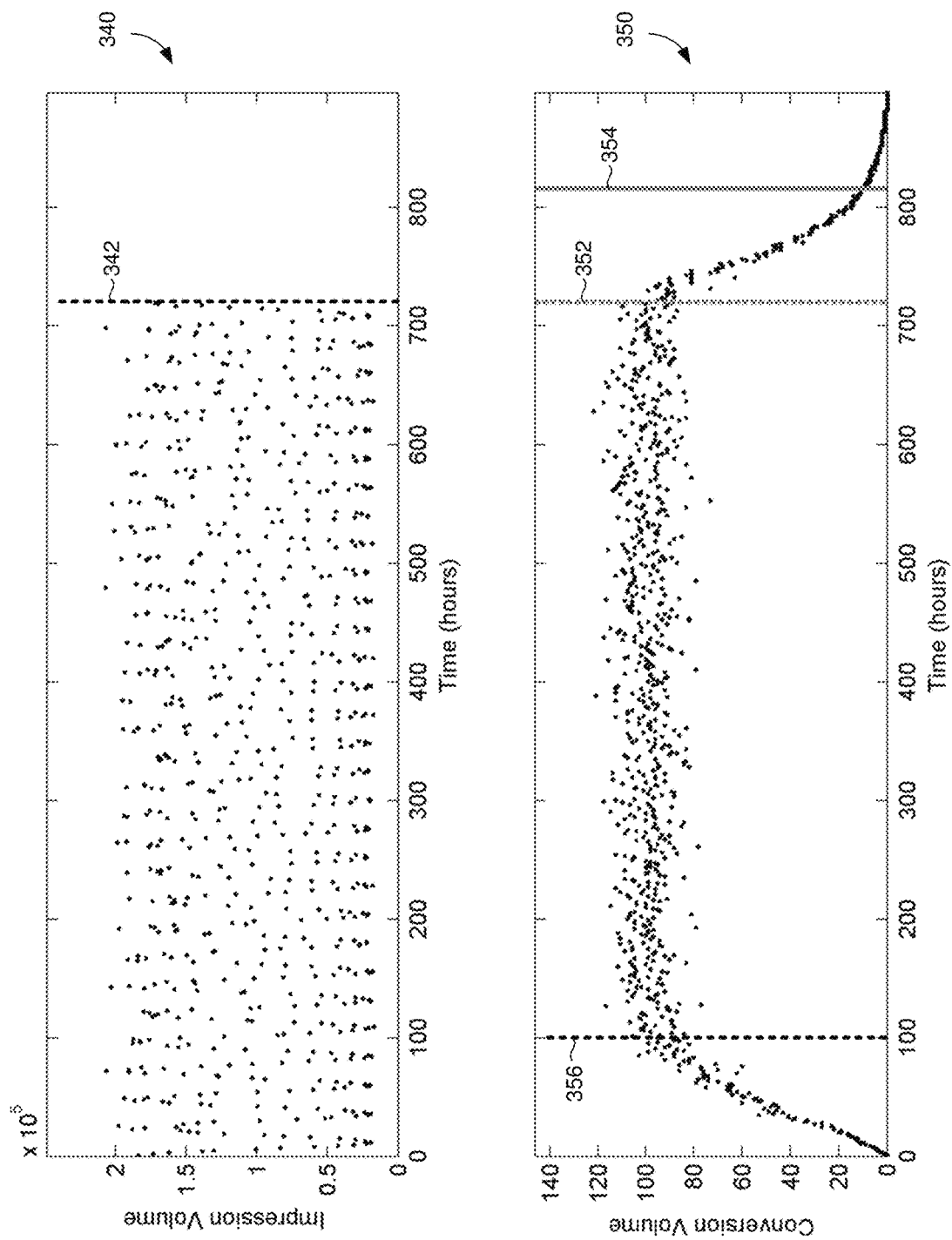
FIG. 3B depicts an exemplary impression volume time dependency and an exemplary conversion volume time dependency for an online campaign, in accordance with embodiments of the present disclosure.

FIG. 3B depicts an exemplary impression volume time dependency and an exemplary conversion volume time dependency for an online campaign, in accordance with embodiments of the present disclosure. Plot 340 shows the impression volume, as a function of time, for an online campaign that provides impressions for about 30 days (~720 hours). Plot 350 shows the corresponding conversion volume for the same campaign. The hashed vertical lines 342 and 352 (in plots 340 and 350 respectively) reflect the t~720 hour mark where the impression volume is terminated and/or reduced, i.e., the campaign ceases to provide impressions at t~720 hours.

Plot 340 shows that the exemplary (but non-limiting) campaign approximately periodically varies the impression volume, with a period of ~24 hour. That is, plot 340 shows significant temporal volatility in the impression volume. An initial transient period of the campaign occurs between t~0 hours and t~100 hours (demarcated by the hashed vertical line 356 in plot 350). During the initial transient period, the conversion volume increases due to the latency distribution of initially provided impressions. In conventional approaches for determining a conversion rate and/or a latency distribution and when a marketer is observing the conversion volume during such an initial transient period (e.g., at t~25 hours), the online marketer may not be able to discriminate whether the low conversion volume is due to a low conversion rate or a relatively long mean latency, i.e., a mean latency >25 hours.

A terminal transient period of the campaign occurs between t~720 hours and t~820 hours (demarcated between vertical hashed line 352 and vertical solid line 354 of plot 350). That is, a terminal transient period begins once providing the impressions is terminated. During the terminal transient period, the conversion volume decreases due to the latency of the impressions provided near the end of the campaign. As shown in plot 350, beyond t~820 hours, very few conversions are observed. Thus, for this exemplary campaign, most of the conversions have a latency of less than 100 hours. Accordingly, as discussed below, a look-back window length of ~100 hours may be appropriate for this campaign.

As shown in plot 350, between the initial and terminal transient periods (i.e., the "steady-state" portion of the campaign), the variation in the conversion volume is primarily affected by the temporal volatility in the impression volume and the "smearing-out" of conversions due to the conversion latency distribution. The order of magnitude of the conversion rate may be estimated by observing plots 340 and 350 during the "steady-state" portion of the campaign as approximately (~10^2/10^5) or ~0.1%. However, in contrast to the various embodiments herein, such an estimation may be biased due to the volatility in the impression volume and the latency distribution. Furthermore, during the transient periods of the campaign, the ratio of the conversion volume to the impression volume cannot be employed to estimate the conversion rate.

That is, in conventional campaign approaches for determining conversion rates and a latency distribution, the marketer may not know whether the relatively low conversion volume is due to a low conversion rate or a long latency during the transient periods. Furthermore, the marketer may not be able to determine whether an observation is within the initial transient period, or the "steady-state" portion of the online campaign until a significant amount of time has passed in the campaign.

When using conventional approaches, by the time that a marketer is able to at least estimate an approximate conversion rate and mean latency (via the slope of the conversion volume in the initial transient period), significant financial resources may have been ineffectively deployed, and/or a significant number of opportunities to capitalize may have been lost. For instance, if a marketer assumes that the low conversion volume is due to a low conversion rate, the marketer may increase the impression volume to drive up the conversion volume. However, if the conversions are distributed within a broad conversion distribution, the marketer may be wasting financial resources by increasing the impression volume. Conversely, if the marketer assumes that the low conversion volume is due to a high mean latency and assumes the conversion volume will increase in the future due to the long latency of conversions, the marketer may lose out in opportunities to provide impressions to users that would otherwise be likely to convert the impressions. In contrast to such conventional approaches, the embodiments herein explicitly employ a constraints between the conversion rate and the latency distribution, while monitoring variances in the impression volume and the conversion volume to simultaneously determine the conversion rate and the latency distribution.

Figure 4A:
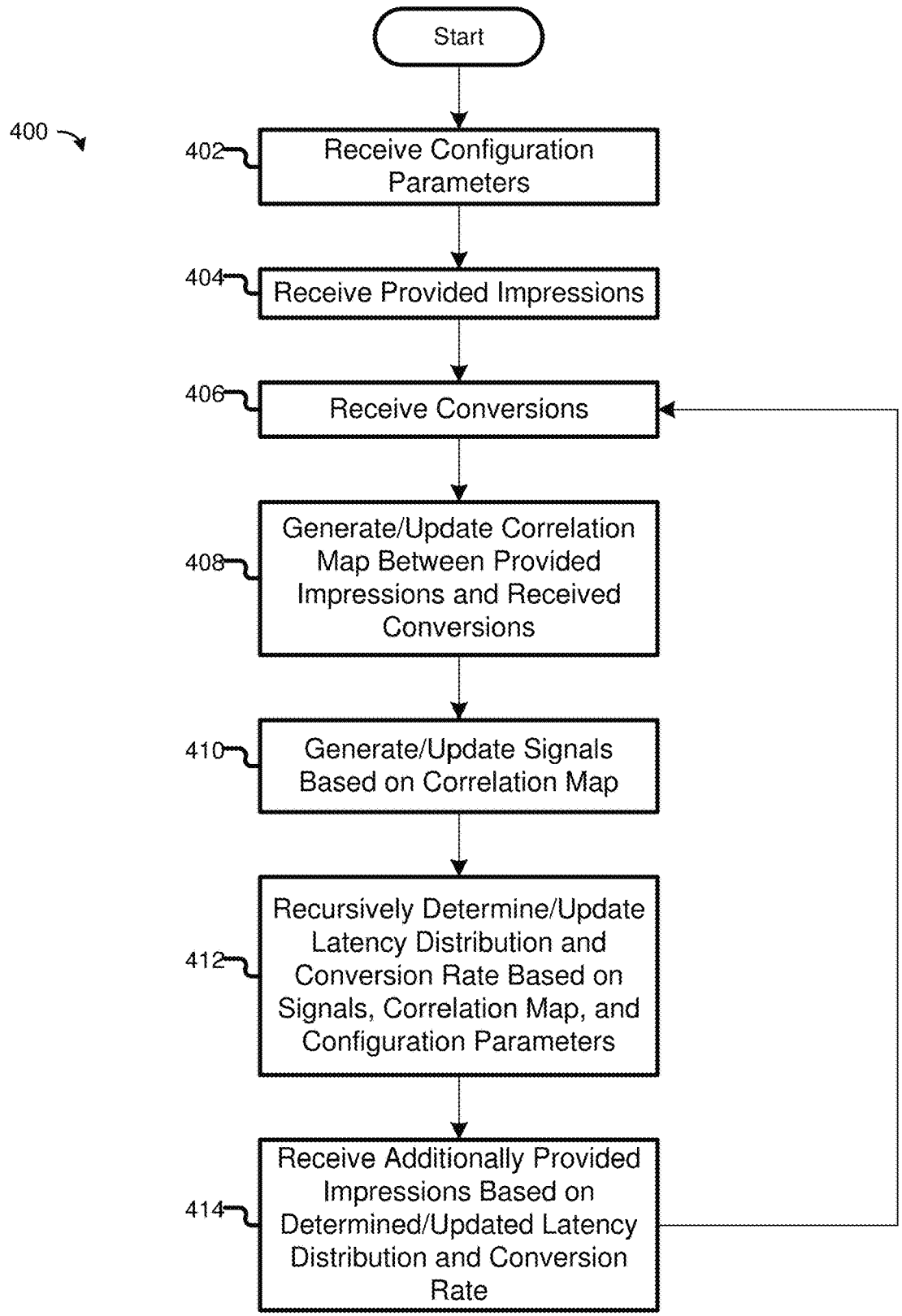
FIG. 4A depicts an illustrative process flow for determining the conversion rate and the latency distribution of an online campaign, in accordance with various embodiments of the present disclosure.

Determining the Conversion Rate and the Latency Distribution of an Online Campaign FIG. 4A depicts an illustrative process flow for determining the conversion rate and the latency distribution of an online campaign, in accordance with various embodiments of the present disclosure. Various campaign control systems, such as but not limited to campaign control system 108 of FIG. 1 and/or campaign control system 208 of FIG. 2 may employ, implement, execute, and/or carry out at least a portion of the process 400 of FIG. 4.

Process 400 begins, after a start block, at block 402 where one or more configuration parameters are received. For instance, configuration parameters 210 of FIG. 2 may be received by at least one of impression module 214, conversion module 216, or profile module 218 of campaign control system 208. Such received configuration parameters may include at least one of, but are not otherwise limited to a look-back window length (L), a data-sampling interval ($\Delta t$), an offset in latency ($\delta$), one or more initial statistical distribution scale parameters (e.g., $T_{min}$), one or more initial statistical distribution parameters (e.g., $\theta_0$), one or more convergence parameters (e.g., e), and the like. The values for the configuration parameters may be provided by a user. Such configuration parameters received at block 402 are discussed throughout.

At block 404, provided impressions to a campaign are received. For instance, impression module 214 may provide campaign 202 one or more impressions, in response to receiving an impression request. In various embodiments, the time evolution of process 400, as well as other processes discussed herein may be discretized via a received configuration parameter such as a data-sampling interval ($\Delta t$). In some embodiments, the data-sampling interval is approximately 15 mins. The discretized time slices (or time samples) of the various processes may be indexed via time index k=0, 1, 2, 3, . . . . At the kth time slice, $t=k \cdot \Delta t$. Thus, each iteration around the loop of process 400 may correspond to a particular time slice indexed via the time index k.

At block 404 (and/or block 412), an impression volume ($n_1(k)$) of impressions may be provided to a campaign, where $n_1(k)$ is the number of impressions provided between the (k−1)th and kth time slices, i.e., within the time interval: [k−1, k]$\Delta t$. Plot 340 of FIG. 3B shows a plot of $n_1(k)$ for each time slice between the time interval: [0, 720 hours]. In the various embodiment, an impression that is provided in between the time interval [k−1, k]Δt may be referred to as "sourced" in the kth time slice.

At block 406, zero or more conversions are received. For instance, conversion module 216 may receive zero or more conversions from campaign 202. More specifically, a conversion volume of conversions is received at each time slice at block 406. Plot 350 of FIG. 3B shows a plot the received conversion volume for each time slice between the time interval [0, 720 hours]. A conversion received in the time interval [k−1, k]Δt may be referred to as observed at or during the kth time slice.

At block 408, a correlation map between the provided impressions and the received conversions is generated and/or updated. A correlation map may be a correlation table, list, or the like. The correlation map be encoded in structure or non-structured data. Profile module 218 or another component of campaign control system 208 such as but not limited to conversion module 216, may be enabled to generate and/or update the correlation map. More specifically, at block 408, for at least a portion of the conversions received (or observed) at the kth time slice, a correspondence is generated with a previously provided impression. That is, the previously provided impression that is most likely to have resulted in the conversion is identified and associated, correlated, and/or paired with the received conversion.

Thus, the correlation map indicates a unique correspondence, association, and/or pairing between at least a portion of the conversions received at block 406 and one of the impressions previously provided via block 404. That is, a received conversion may be mapped to a previously provided impression. More specifically, for at least a portion of the received conversions, the correlation map may include one or more entries that indicates the time slice associated with the observation (or receiving) of the conversion, the associated/corresponding impression, and the time slice associated with the sourcing (or providing) of the associated/corresponding impression. The correlation map may include an indication of a latency (τ) for at least a portion of the conversions. The latency may be determined via the temporal difference between the time slice associated with the observation of the conversion and the time slice associated with the sourcing of the impression associated with the conversion. As discussed throughout, the conversions may be indexed via the index i, such that $\tau_i$ refers to the latency of the ith observed conversion. Thus, the correlation map may index the time slices via a first index (e.g., k) and index the conversions via a second index (e.g., i). In at least one embodiment, the correlation map includes an entry that indicates the time slice associated with the sourcing of each impression. Note that only a fraction of the provided impressions are associated with a conversion because the conversion rate of a campaign is typically less than 1.0.

In the various embodiments, a look-back window is employed. The look-back window length (L) may be a configuration parameter received at block 402. The look-back window length terminates the search space of previously provided impressions to associate with each conversion. Thus, as discussed throughout, an appropriately configured look-back window may enable a computationally efficient determination of the conversion rate and the latency distribution. A look-back window effectively cuts off a relatively insignificant tail-portion of the latency distribution. For the relatively few conversions included in the tail-portion (as defined by L) of a latency distribution, the correlation map may not include associated entries. Thus, the tail-portion of a latency distribution may be defined as Δt·k>L. In some embodiments, conversions with a latency greater than the L are observed and included in the correlation map, but are not associated with a previous impression. Histograms of latency distributions (such as histograms 110, 120, and 130 of FIG. 3B) may include $$\frac{L}{\Delta T} + 1$$

discrete bins. A visual inspection of plot 350 of FIG. 3B shows that L~100 (the temporal difference between vertical lines 352 and 354) is an appropriate configuration for the look-back window of the campaign plotted in FIG. 3B.

At block 410, the correlation map is employed to generate and/or update one or more signals based on the provided impressions, received conversions, the correlation map, and/or one or more of the configuration parameters. At least one of the conversion module 216 of the profile module 218 of a campaign control system 208 may be enabled to generate/update various signals. The generated/updated signals may include one or more input signals. The various signals discussed herein may be time-dependent signals that are temporally discretized via the time index k. One such input signal includes $n_1(k)$, as discussed above. At block 410, another signal ($n_E(k)$) may be determined via the correlation map, where $n_E(k)$ is the total number of conversions that are associated/correlated with an impression sourced at the kth time slice. Based on $n_E(k)$ and the correlation map, signal ($n_E(k_1, k_2)$) is determined, where $n_E(k_1, k_2)$ is the number of conversions observed at the $k_2$ time slice and associated with an impression sourced at the $k_1$ time slice ($k_1 \le k_2$).

An uncensored conversion input signal ($\overline{n_{UE}}(k)$) may be determined/update at block 410 based on $n_E(k_1, k_2)$ and the correlation map. The uncensored conversion input signal may encode an uncensored conversion vector (of dimensionality $$\frac{L}{\Delta T} + 1),$$

where the ith element/component of the vector is determined via as $\overline{n_{UE}}(k)(i) = n_E(k-i, k)$ for i=0, 1, 2, . . . , $$\frac{L}{\Delta t}.$$

Because the uncensored conversion input signal encodes a vector, the uncensored conversion input signal (as well as other signals discussed herein) may be referred to a vector signals.

Figure 5A:
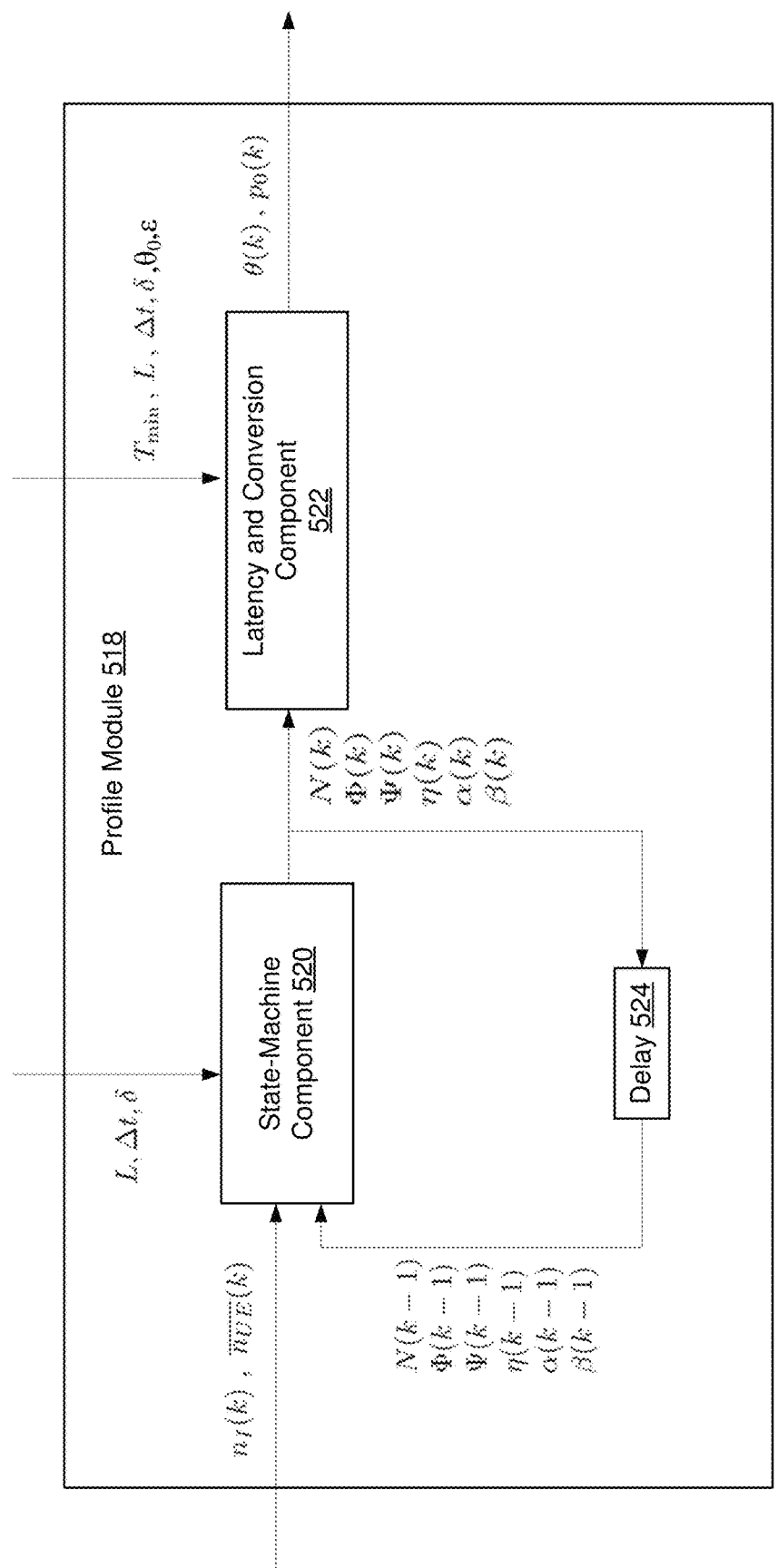
FIG. 5A shows an exemplary profile module for a latency distribution model that is in accordance with various embodiments of the present disclosure.

In some embodiments, signal ($n_E^{tot}(k_1, k_2)$) may be generated and/or updated at block 410, where $n_E^{tot}(k_1, k_2)$ encodes the total number of conversions sourced to the time interval [$k_1-1, k_1$]Δt and observed until $k_2$ time slice, i.e., $n_E^{tot}(k_1, k_2) = \Sigma_{k'=k_1}^{k_2} n_E(k_1, k')$. For various embodiments, signal (N(k)) may be generated and/or updated at block 410, where N(k) encodes the total number of conversions observed between the time interval [0, k·Δt], i.e., N(k)= $\Sigma_{k_1=0}^{k} \Sigma_{k_2=k_1}^{k} n_E(k_1, k_2) \Sigma_{k'=0}^{k_2} n_E^{tot}(k', k)$. In at least one embodiment, some of the signals generated/updated at block 410, such as but not limited to the signal N(k), may be internal states of profile module 218. Other signals representing internal states of a profile module, such as but not limited to N(k), Φ(k), Ψ(k), ηi(k), α(k), and β(k), as discussed below may be generated/updated via a state-machine component of the profile module, such as but not limited to state-machine component 520 of profile module 518 of FIG. 5A. Pseudo-code shown in FIG. 5B shows one exemplary embodiment of a calculation of such internal states. In various embodiments, at least one or more of the signals discussed in conjunction with block 410 is generated and/or updated at block 412.

At block 412, the latency distribution and the conversion rate ($p_0(k)$) for the campaign are iteratively and simultaneously determined. In various embodiments, the determination of the latency distribution and the conversion rate is based on one or more signals discussed in conjunction with block 410, the correlation map, and/or one or more of the configuration parameters. The determination of the latency distribution and the conversion rate may be based on the provided impressions and/or the received conversions. In various embodiments, a parameterized statistical distribution is employed to model the latency distribution of the campaign. Thus, determining the latency distribution is equivalent to determining one or more distribution parameters of the statistical distribution. In some embodiments, a parameterized Pareto distribution is employed to model the latency distribution of the campaign. However, it should be understood that other embodiments are not so limited. That is, the various embodiments may employ any number of other parameterized statistical distributions, using the equivalent and/or similar methodologies as those discussed below.

A probability density function (pdf) of a parameterized truncated Pareto distribution is represented as $$f(\tau|\theta) = \frac{\theta \cdot T_{min}^\theta}{\tau^{\theta+1}}{1 - \left(\frac{T_{min}}{T_{max}}\right)^\theta}.$$

The distribution parameters include a scale parameter ($T_{min}$), which is the minimum observational value of a latency ($\tau$), a maximum observational value ($T_{max}$) of a latency, and a shape parameter ($\theta$), where $0 < T_{min} \leq \tau \leq T_{max}$, $\theta > 0$. The cumulative distribution function (cdf) of the parameterized truncated Pareto distribution is represented as $$F(\tau|\theta) = \frac{1 - \left(\frac{T_{min}}{\tau}\right)^\theta}{1 - \left(\frac{T_{min}}{T_{max}}\right)^\theta}.$$

In some of the various embodiments $T_{min}$ is updated to be the minimum observed latency but in one embodiment $T_{min} = \Delta t$. In some of the various embodiments, $T_{max} = L + \Delta t$, due to the look-back window. In at least one embodiment, $T_{min}$ is a configuration parameter, such as one of the configuration parameters included in configuration parameters 210 of FIG. 2. In the non-limiting embodiments employing the above truncated Pareto distribution, determining the latency distribution is equivalent to determining $\theta(k)$. For each time slice, a maximum likelihood estimation (MLE) approach is employed to simultaneously determine $p_0(k)$ and $\theta(k)$. An MLE provides a method for determining optimized values of parameters that parameterize a probability distribution based on observations of the random variables of the probability distribution. In one non-limiting embodiment, a vector of observations ($\vec{\tau}$) of a random variable is assumed to be distributed via a pdf ($Pr(\tau|\hat{\theta})$) parameterized by a vector of parameters ($\hat{\theta}$). Note that $Pr(\tau|\hat{\theta})$ represents any number of parameterized pdfs, such as but not limited to the Pareto pdf $f(\tau|\theta)$. An MLE enables the determination of the most-likely (or optimized) values for each of the parameters based on the observations of the random variable via the optimization of the following expression, $$\underset{\hat{\theta}}{\operatorname{argmax}} \prod_i Pr(\tau_i|\hat{\theta}),$$

where the index i represents the components of the vector of observations. That is, $\tau_i$ represents the latency for the ith observed conversion (included in the correlation map). In the various embodiments employing a pdf that is parameterized by a single parameter, such as but not limited to the Pareto distribution, such that $\hat{\theta} \rightarrow \theta$. Furthermore, because the following relationship holds, a logarithmic MLE may be performed.

$$\underset{\theta}{\operatorname{argmax}} \prod_i Pr(\tau_i|\theta) = \underset{\theta}{\operatorname{argmax}} \sum_i \log(Pr(\tau_i|\theta))$$

The total number of conversions that are sourced at time slice k, that are expected to be eventually observed is $p_0 \cdot n_I(k_1)$. The fractional portion of conversions sourced at time slice $k_1$ and observed at time slice $k_2$ is $F((k_2-k_1+1)\Delta t|\theta)$, where $F(\tau_i|\theta)$ is the corresponding cdf for the pdf $Pr(\tau_i|\theta)$. Thus, the total number of unobserved conversions at $k_2$ that are sourced to $k_1$ ($n_E^{uo}(k_1, k_2)$) may be determined as $$n_E^{uo}(k_1,k_2) = p_0 \cdot n_I(k_1)(1 - F((k_2-k_1+1)\Delta t|\theta)).$$

Employing the above relationship in an algebraic manipulation of the logarithmic MLE results in $$\underset{\theta}{\operatorname{argmax}} \left( \sum_i \log(Pr(\tau_i|\theta)) + \log\left( \prod_{k_1=0}^{L/\Delta t} (1 - F((k_1+1)\Delta t|\theta))^{n_E^{uo}(k-k_1,k_1)} \right) \right)$$

Thus, determining the latency distribution may include determining the shape parameter ($\theta$) that optimizes the above expression. Note that the above expression requires and evaluation of the (unknown) conversion rate because $n_E^{uo}(k_1, k_2)$ is explicitly dependent on the conversion rate. To simultaneously determine the conversion rate and the latency distribution, the conversion rate may be constrained via a relationship (or correlation) between the observed conversions, conversions occurring prior to the look-back window, and the portion of impressions that have had the opportunity to convert. More specifically, at the kth time slice, $$\sum_{k_1=0}^{k} \sum_{k_2=k_1}^{k} n_E(k_1, k_2) = p_0 \cdot \left( \sum_{k_1=0}^{k-1-\frac{L}{\Delta t}} n_I(k_1) + \sum_{k_1=0}^{L/\Delta t} n_I(k-k_1) \cdot F((k_1+1)\Delta t|\theta) \right)$$

The left-hand side of the above expression represents the total number of conversions observed up to kth time slice, i.e., N(k). The first term on the right-hand side of the above expression represents the number of impressions that have been converted prior to the look-back window associated with the kth time slice. The second term on the right-hand side of the above expression represents the number of impressions (within the look-back window) that have been converted, based on the latency distribution. Thus, the above expression indicates a constraint (i.e., an explicit relationship) between the conversion rate and the latency distribution. Note that $n_E(k_1, k_2)$ and $n_1(k_1)$ are signals that may be generated and/or updated at block 410.

Lagrange multipliers may be employed to optimize a function that is subject to one or more constraints. For instance, in an exemplary but non-limiting two-dimensional example, a Lagrange multiplier may be employed to optimize (maximize or minimize) a function $f(\theta, p_0)$ subject to the constraint $g(\theta, p_0)=c$. Point $(\theta', p'_0, \lambda')$ is a stationary point of the Lagrangian expression: $\mathcal{L}(\theta, p_0, \lambda) = f(\theta, p_0) - \lambda \cdot (g(\theta, p_0) - c)$, where $\lambda$ is a Lagrange multiplier, such that $f(\theta', p_0')$ is optimized. Thus, optimizing $f(\theta, p_0)$ includes finding a stationary point of $\mathcal{L}(\theta, p_0, \lambda)$.

Using the above expressions, $$f(\theta, p_0) = \underset{\theta}{\operatorname{argmax}} \left( \sum_i \log(Pr(\tau_i | \theta)) + \log \left( \prod_{k_1=0}^{L/\Delta t} (1 - F((k_1+1)\Delta t | \theta))^{n_E^{tot}(k-k_1, k_1)} \right) \right)$$

$$g = (\theta, p_0) = p_0 \cdot \left( \sum_{k_1=0}^{k-1-\frac{L}{\Delta t}} n_I(k_1) + \sum_{k_1=0}^{L/\Delta t} n_I(k-k_1) \cdot F((k_1+1)\Delta t | \theta) \right), \text{ and}$$

$$c = \sum_{k_1=0}^{k} \sum_{k_2=k_1}^{k} n_E(k_1, k_2).$$

A stationary point of $\mathcal{L}(\theta, p_0, \lambda)$ may be determined based on the simultaneous solution of the following three equations:

$$\frac{\partial \mathcal{L}(\theta, p_0, \lambda)}{\partial \theta} = \frac{\partial \mathcal{L}(\theta, p_0, \lambda)}{\partial p_0} = \frac{\partial \mathcal{L}(\theta, p_0, \lambda)}{\partial \lambda} = 0$$

That is, optimizing $f(\theta, p_0)$ may be accomplished by finding the points where the gradient of $\mathcal{L}(\theta, p_0, \lambda)$ at least approximately vanishes. By determining the stationary point $(\theta', p'_0, \lambda')$ that simultaneously satisfies the above three equations results in simultaneously determining the conversion rate for the kth time slice $(p_0(k)=p_0')$ and the latency distribution for the kth time slice, via $\theta(k)=\theta'$.

As noted above, in at least one non-limiting embodiment, the truncated Pareto distribution is employed as the parameterized probability distribution. In such an embodiment, the above three equations may be algebraically manipulated to determine the optimized values for each of: $\theta$, $p_0$, and $\lambda$. More specifically, FIG. 4B shows three equations for the determination of $\theta$, $p_0$, and $\lambda$ when the Pareto statistical distribution is employed. Equations 420, 430, and 440 are written in terms of signals $n_1(k)$, $n_E^{tot}(k_1, k)$, and N(k), where $\tau_i$ is the latency for the ith observed conversion. Note that there is no closed form solution for $\theta$ in equation 440. Because $\theta$, $p_0$, and $\Delta$ are non-linearly coupled via equations 420, 430, and 440, iterative numerical methods may be employed to determine simultaneous solutions for $\theta$, $p_0$, and $\lambda$. Various embodiments for determining simultaneous solutions for $\theta$, $p_0$, and $\lambda$, via equations 420, 430, and 440 are discussed in conjunction with FIGS. 5A-6B. However, briefly, at block 412, optimized values for each of $\theta$, $p_0$, and $\lambda$ may be determined via various numerical techniques and/or methods. By determining optimized values for $\theta$ and $p_0$, each of the conversion rate and the latency distribution is determined.

At block 414, additionally provided impressions are received. The additional received impression may be based on the determined/updated latency distribution and conversion rate. That is, controlling of the campaign may be updated and adjusted based of the determination of the latency distribution and the conversion rate, such that additional impressions are provided and received. For instance, the controlling of bidding on additional impressions may be updated and/or adjusted, where the updating of the controlling of the bidding is based on the determination of the latency distribution and the conversion rate. More specifically, the bidding process and/or strategy for additional impressions may be updated based on the determination of the latency distribution and the conversion rate. Process 400 may increment k, i.e., k→k+1, and return to block 406 to receive additional conversions.

Exemplary Profile Module for a Pareto Distribution

FIG. 5A shows an exemplary profile module 518 for a Pareto distribution. Profile module 518 may be employed in a campaign control system, such as but not limited to campaign control system 108 of FIG. 1 and/or campaign control system 208 of FIG. 2. For instance, profile module 208 may include similar components, features, and/or functionalities as profile module 518. Profile module 518 is enabled to simultaneously determine the conversion rate and the latency distribution for a campaign, via the various methods discussed herein, by employing a Pareto distribution. It should be understood that other similar profile modules may be enabled to simultaneously determine the conversion rate and the latency distribution of a campaign by employing other parameterized statistical distributions via similar methodologies, i.e., profile module 518 is an exemplary, but non-limiting, embodiment.

Profile module 518 includes a state-machine component 520, a latency and conversion component 522, and a delay 524. State-machine component 520 may receive one or more configuration parameters, such as at least a portion of configuration parameters 210 of FIG. 2. For instance, as shown in FIG. 5A, state-machine components 520 may receive at least look-back window length (L), data-sampling interval ($\Delta t$), and an offset in latency ($\delta$). The offset in latency configuration parameter may be employed to avoid numerical difficulties, such as calculating a logarithm of values near zero. Similarly, latency and conversion component 522 may receive one or more configuration parameters. In addition to the look-back window length, the data-sampling interval, and the offset in latency configuration parameters, latency and conversion component 522 may receive an initial shape parameter ($\theta_0$), and a convergence threshold ($\varepsilon$), each of which may be received from configuration parameters 210.

State-machine component 520 receives input signals, such as but not limited to at least a portion of the signals generated and/or updated at block 410 of FIG. 4A. As shown in FIG. 5A, state-machine component 520 receives at least input signals $n_1(k)$ and $\overline{n_{UE}}(k)$. State-machine component 520 determines and stores values for various internal states based on the input signals, previous values of the internal states, and the received configuration parameters.

As shown in FIG. 5A, the determined/updated internal states include: N(k), Φ(k), Ψ(k), η(k), α(k), and β(k). A delay 524 provides a temporal delay of approximately Δt so that the internal states, which are stored via state-machine component 520, are employed as feedback for the next time slice, as shown via the feedback loop in FIG. 5A.

The determination and/or updating of the internal states is shown explicitly in the pseudo-code of FIG. 5B. However, briefly, as discussed above N(k) encodes the total number of conversions observed between the time interval [0, k·Δt]. Φ(k) is a vector of size $$M = \frac{L}{\Delta t} + 1,$$

where the ith (i=0, 1, . . . , $$\frac{L}{\Delta t})$$

component encodes the number of conversions sourced to (k–i) time slice. Ψ(k) is a vector of size $$M = \frac{L}{\Delta t} + 1,$$

where the ith (i=0, 1, . . . , $$\frac{L}{\Delta t})$$

component encodes the number of impressions sourced to (k–i) time slice. η(k) encodes the sum of the natural logarithm of all of the latencies until time kΔt. α(k) represents the number of all conversions observed until kΔt and sourced to beyond the look-back window associated with the kth time slice, i.e., prior to time kΔt–L. β(k) represents the number of all the provided impressions sourced to beyond the look-back window associated with the kth time slice, i.e., prior till time kΔt–L. Pseudo-code of FIG. 5B shows the determination of each of the internal states based on the input signals and the various received configuration parameters.

As shown in FIG. 5A, each of the determined/updated internal states is outputted by state-machine component 520 and provided to delay 524, and as input to latency and conversion component 522. Latency and conversion component 522 determines/updates the latency distribution (as parameterized via θ(k)) and conversions rate ($p_0(k)$) based on the inputted internal states and the configuration parameters. Latency and conversion component 522 iteratively determines values for Δ, p0, and θ of equations 420, 430, and 440 of FIG. 4B via computational and/or numerical methods. One non-limiting embodiment of such a numerical method includes employing various interior point, Newton-Raphson, and/or barrier methods to simultaneously solve equations 420, 430, and 440. A Newton-Raphson method may include a Newton method for finding successive approximations for the root of a function, e.g., an iterative methodology for determining estimates or approximations for the roots of multivariate functions based on derivatives of the function. In various embodiments, an interior point method is employed, while in other embodiments a Newton-Raphson method is employed.

Figure 6B:
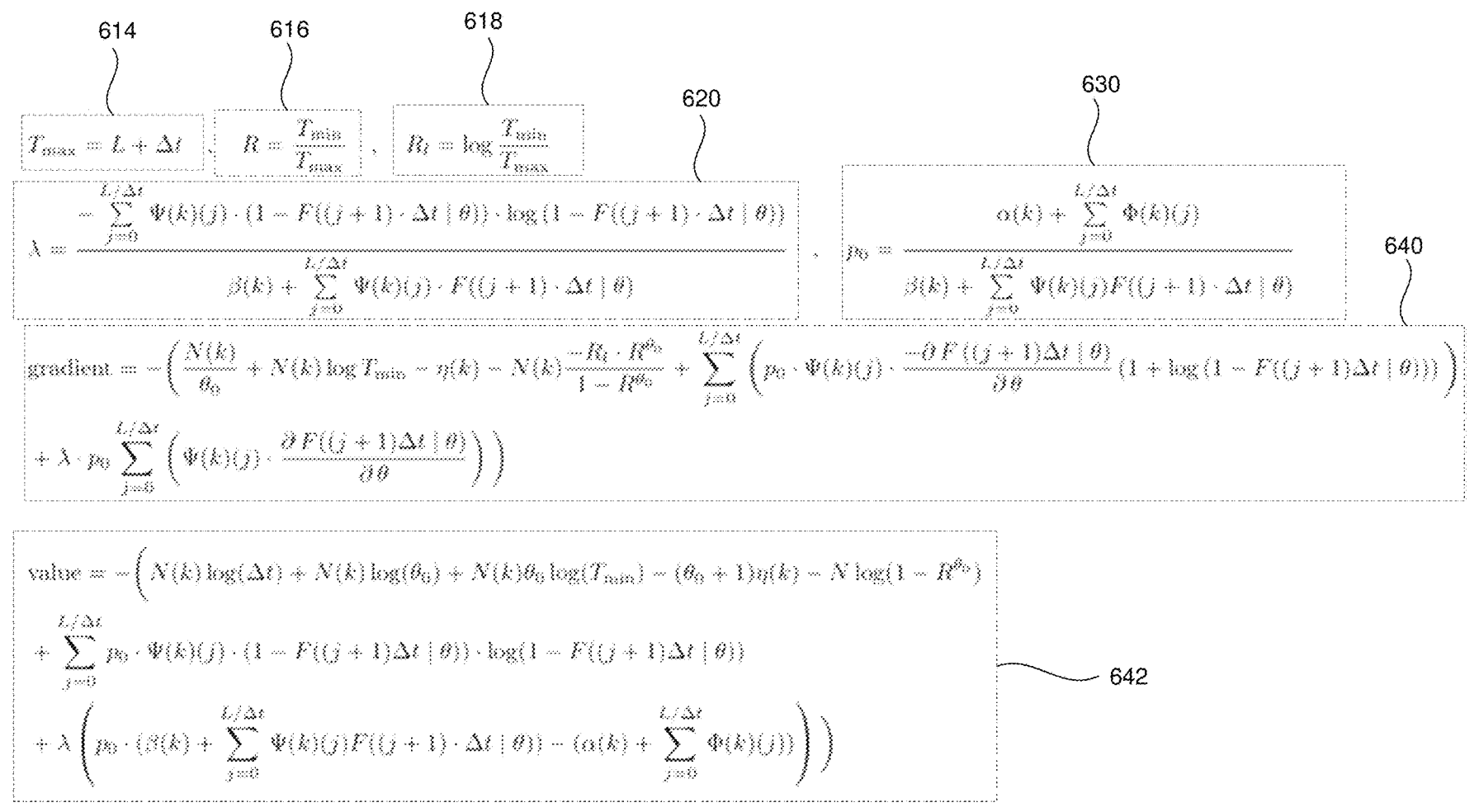

FIG. 6A shows pseudo-code implementing an interior point method to simultaneously and iteratively determine θ(k) and $p_0(k)$ via equations 420, 430, and 440. The embodiment shown in the pseudo-code in FIG. 6A is non-limiting, and other numerical methods may be employed to numerically simultaneously solve equations 420, 430, and 440. In FIG. 6A, an objective function is determined based on equation 440. The objective function is represented as a function of the internal states, configuration parameters, and a current estimate of θ(k), and shown in equation 642 of FIG. 6B. The gradient of the objective function, represented as a function of the internal states, configuration parameters, and a current estimate of θ(k), is shown in equation 640 of FIG. 6B.

As shown in the pseudo-code of FIG. 6A, a current value of the function and a current value of the gradient (each based on a current estimate of θ(k), i.e., $θ_0$), is iteratively determined. The current value of the function and the gradient are provided to an interior points method that updates the current estimate of θ(k). The iterations are continued until convergence is achieved (as defined via the convergence threshold configuration parameter) is achieved. That is, $θ_0$ is iteratively updated, via the interior points method, until the error between current and updated $θ_0$ of the objective function adequately vanishes. Upon convergence, θ(k) is set to the final value of $θ_0$ and $p_0(k)$ is determined based on θ(k) via equation 630 of FIG. 6B.

FIG. 6B shows explicit formulations of the objective function and it's gradient. Equation 614 defines $T_{max}$ based on configuration parameters, while equations 616 and 618 define latent values employed to determine the value of the objective function and its gradient. Equations 620 and 630 recasts equations 420 and 430 respectively based on the internal states of profile module 518 of FIG. 5A. Equations 640 and 642 show the explicit computations for the gradient of the objective function and the value of the objective function, based on the internal states, configurations parameters, and a current estimate of θ(k).

Exemplary Computing Platform

Figure 7:
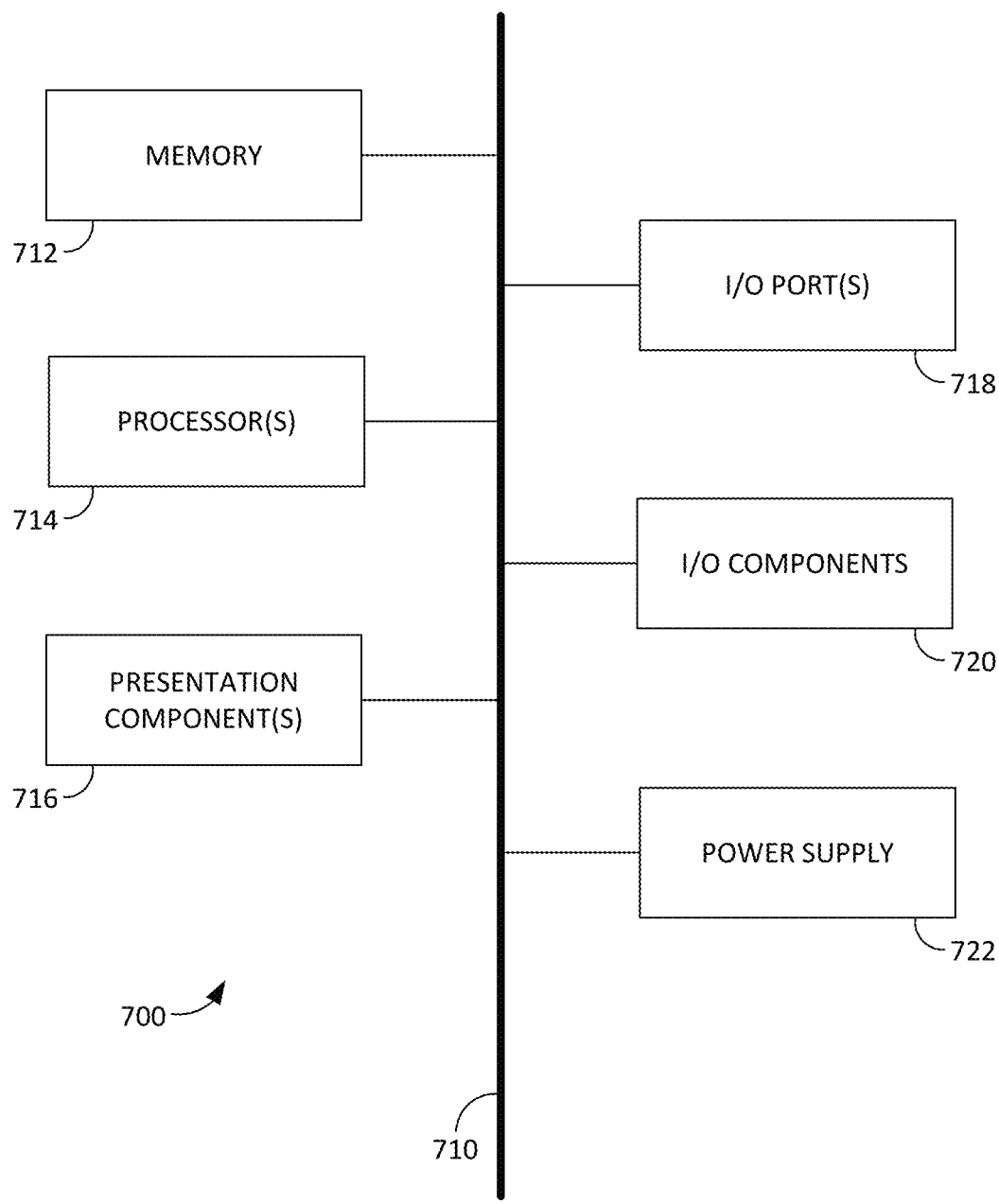
FIG. 7 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, I/O components 720, and an illustrative power supply 722. Bus 710 represents what may be one or more buses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 716 while also being one of the I/O components 720. As another example, processors have memory integrated therewith in the form of cache; however, there is no overlap between the one or more processors 714 and the memory 712. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media may include both volatile and/or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 714 that read data from various entities such as memory 712 or I/O components 720. Presentation component(s) 716 present data indications to a user or other device. Illustrative presentation components include a display device, speaker, printing component, vibrating component, etc.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternative embodiments may be practiced with only some of the described aspects. For purposes of explanation, specific numbers, materials, and configurations are set forth in order to provide a thorough understanding of the illustrative embodiments. However, it will be apparent to one skilled in the art that alternative embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A method for determining a conversion profile for a campaign comprising:
   receiving, by a processor of a campaign control system, a plurality of conversions from the campaign, wherein a conversion of the plurality of conversions is associated with a converted impression of a plurality of converted impressions and the plurality of converted impressions is a subset of a set of previously provided impressions;

determining, by the processor, an observed latency for at least a portion of the plurality of conversions based on a temporal difference between the conversion and the converted impression;

concurrently determining by the processor and based on the plurality of conversions, the set of previously provided impressions, and the observed latency:
   (i) a conversion rate for the campaign; and
   (ii) one or more parameters of a latency distribution for the campaign, wherein the concurrently determining is based on a relationship between the conversion rate and the one or more parameters of the latency distribution, wherein the one or more parameters of the latency distribution comprise a shape parameter and a scale parameter, wherein the conversion rate indicates a ratio of an overall size of the plurality of converted impressions to a size of the set of previously provided impressions and the latency distribution indicates a temporal distribution of observed latencies comprising the observed latency; and controlling, by the processor, bidding associated with the campaign based on at least one of the conversion rate or the one or more parameters of the latency distribution.

2. The method of claim 1, comprising:
generating a correlation map between the plurality of conversions and the plurality of converted impressions, wherein for the at least a portion of the plurality of conversions, the correlation map indicates the converted impression and the observed latency.

3. The method of claim 1, wherein the latency distribution is a Pareto distribution.

4. The method of claim 1, wherein determining the conversion rate and the one or more parameters of the latency distribution comprises employing a maximum likelihood estimation (MLE) based on the observed latencies.

5. The method of claim 1, wherein determining the conversion rate and the one or more parameters of the latency distribution comprises:
determining a first conversion rate and a first latency distribution;
updating the first conversion rate based on a current estimated latency distribution to determine the conversion rate; and
updating the first latency distribution based on a current estimated conversion rate to determine the one or more parameters of the latency distribution.

6. The method of claim 1, wherein a constraint between the conversion rate and the latency distribution is employed to determine each of the conversion rate and the one or more parameters of the latency distribution, the constraint being is based on a total number of observed conversions, a number of impressions that have been provided outside of a current look-back window, and a number of impressions that have been provided within the current look-back window.

7. The method of claim 1, wherein determining the conversion rate is based on a ratio of (i) a first value corresponding to a total number of conversions sourced to a first time interval to (ii) a second value corresponding to a first number of impressions provided within a second time interval and a third value corresponding to the first time interval.

8. One or more computer-readable storage media having instructions stored thereon, wherein the instructions, when executed by a processor of a computing device, cause the computing device to perform actions comprising:
receiving, by the processor, a plurality of conversions from a campaign, wherein a conversion of the plurality of conversions is associated with a converted impression of a plurality of converted impressions and the plurality of converted impressions is a subset of a set of previously provided impressions;

determining, by the processor, an observed latency for at least a portion of the plurality of conversions based on a temporal difference between the conversion and the converted impression;

concurrently determining by the processor and based on the plurality of conversions, the set of previously provided impressions, and the observed latency:
   (i) a conversion rate for the campaign; and
   (ii) one or more parameters of a latency distribution for the campaign, wherein the concurrently determining is based on a relationship between the conversion rate and the latency distribution, wherein the one or more parameters of the latency distribution comprise at least one of a shape parameter or a scale parameter, wherein the conversion rate indicates a ratio of an overall size of the plurality of converted impressions to a size of the set of previously provided impressions and the latency distribution indicates a temporal distribution of observed latencies comprising the observed latency; and controlling, by the processor, bidding associated with the campaign based on at least one of the conversion rate or the one or more parameters of the latency distribution.

9. The one or more computer-readable storage media of claim 8, the actions comprising:
generating a correlation map between the plurality of conversions and the plurality of converted impressions, wherein for the at least a portion of the plurality of conversions, the correlation map indicates the converted impression and the observed latency.

10. The one or more computer-readable storage media of claim 8, wherein the latency distribution is a Pareto distribution.

11. The one or more computer-readable storage media of claim 8, wherein determining the conversion rate and the one or more parameters of the latency distribution comprises employing a maximum likelihood estimation (MLE) based on the observed latencies.

12. The one or more computer-readable storage media of claim 8, the actions comprising:
determining one or more Lagrange multipliers based on the relationship between the conversion rate and the latency distribution.

13. The one or more computer-readable storage media of claim 8, wherein the relationship between the conversion rate and the latency distribution is based on a total number of observed conversions, a number of impressions that have been provided outside of a current look-back window, and a number of impressions that have been provided within the current look-back window.

14. The one or more computer-readable storage media of claim 8, wherein determining the conversion rate and the one or more parameters of the latency distribution comprises employing a Newton-Raphson method to iteratively update values for the conversion rate and the one or more parameters of the latency distribution based on each of previously determined values for the conversion rate and the one or more parameters of the latency distribution.

15. A campaign control system for determining a conversion profile for a campaign comprising:
a processor; and
a computer-readable storage medium, coupled with the processor, having instructions stored thereon, which, when executed by the processor, perform actions comprising:
receiving, by the processor, a plurality of conversions from the campaign, wherein a conversion of the plurality of conversions is associated with a converted impression of a plurality of converted impressions and the plurality of converted impressions is a subset of a set of previously provided impressions;
determining, by the processor, an observed latency for at least a portion of the plurality of conversions based on a temporal difference between the conversion and the converted impression;
concurrently determining, by the processor and based on the plurality of conversions, the set of previously provided impressions, and the observed latency:
(i) a conversion rate for the campaign; and
(ii) one or more parameters of a latency distribution for the campaign,
wherein the concurrently determining is based on a relationship between the conversion rate and the one or more parameters of the latency distribution; and
controlling, by the processor, bidding associated with the campaign based on at least one of the conversion rate or the one or more parameters of the latency distribution.

16. The campaign control system of claim 15, the actions comprising:
generating a correlation map between the plurality of conversions and the plurality of converted impressions, wherein for the at least a portion of the plurality of conversions, the correlation map indicates the converted impression and the observed latency.

17. The campaign control system of claim 15, wherein the one or more parameters of the latency distribution comprise a shape parameter and a scale parameter.

18. The campaign control system of claim 15, wherein determining the conversion rate and the one or more parameters of the latency distribution comprises employing a maximum likelihood estimation (MLE) based on the observed latency.

19. The campaign control system of claim 15, wherein a constraint between the conversion rate and the latency distribution is employed to determine each of the conversion rate and the one or more parameters of the latency distribution, the constraint being based on a total number of observed conversions, a number of impressions that have been provided outside of a current look-back window, and a number of impressions that have been provided within the current look-back window.

20. The campaign control system of claim 15, wherein determining the conversion rate and the one or more parameters of the latency distribution comprises employing at least one of an interior point method or a Newton-Raphson method to iteratively update values for the conversion rate and the one or more parameters of the latency distribution based on each of previously determined values for the conversion rate and the one or more parameters of the latency distribution.

* * * * *